United States Patent

Fukushima et al.

[11] Patent Number: 5,569,341
[45] Date of Patent: Oct. 29, 1996

[54] PNEUMATIC RADIAL TIRE WITH SIDE CUT RESISTANCE

[75] Inventors: Masaharu Fukushima, Saitama; Yuichi Nagai, Tokyo, both of Japan

[73] Assignee: Bridgestone Corporation, Tokyo, Japan

[21] Appl. No.: 354,108

[22] Filed: Dec. 6, 1994

[30] Foreign Application Priority Data

Dec. 21, 1993 [JP] Japan ................................ 5-322671

[51] Int. Cl.⁶ .................... B60C 1/00; B60C 9/08; B60C 15/00; B60C 15/06
[52] U.S. Cl. .................... 152/527; 152/541; 152/546; 152/547; 152/552; 152/554; 152/555; 152/556
[58] Field of Search ............................ 152/541, 546–547, 152/552, 554–555, 527, 556

[56] References Cited

U.S. PATENT DOCUMENTS 5,048,584  9/1991  Nakano et al. .................... 152/555 X Primary Examiner—Adrienne C. Johnstone
Attorney, Agent, or Firm—Sughrue, Mion, Zinn, Macpeak & Seas

[57] ABSTRACT

A pneumatic radial tire, particularly for a construction vehicle, has a carcass ply arranged toroidally between a pair of bead cores, containing rubber coated steel cords disposed radially therein, being turned up around each bead core from the inside to the outside of the tire and the turn-up portion of which around each bead core extends to around ½ height of the tire height H. When the radical length of an overlapping portion of the turn-up portion of the carcass ply and the main carcass ply is $h_1$ and the thickness of the overlapping portion is $w_1$ within a range of ±0.1 H having half height H/2 of the tire height H as the center, the radial length h and the thickness w of a reinforcing rubber material arranged between the turn-up portion of the carcass ply and the main ply satisfy the following formulae (1) $0.2w_1 \leq w \leq 1.0w_1$, and
(2) $0.5h_1 \leq h \leq 1.0h_1$, and said reinforcing rubber material satisfies the following conditions (3) 100 parts by weight of rubber includes 10–80 parts by weight of a cis-1,4 polybutadiene, and
(4) a modulus of elasticity $M$ is 60 kgf/cm² $\leq M \leq$ 100 kgf/cm² at 300% elongation and a rebound resilience coefficient $R$ is $0.4 < R < 0.7$.

8 Claims, 4 Drawing Sheets

FIG. I
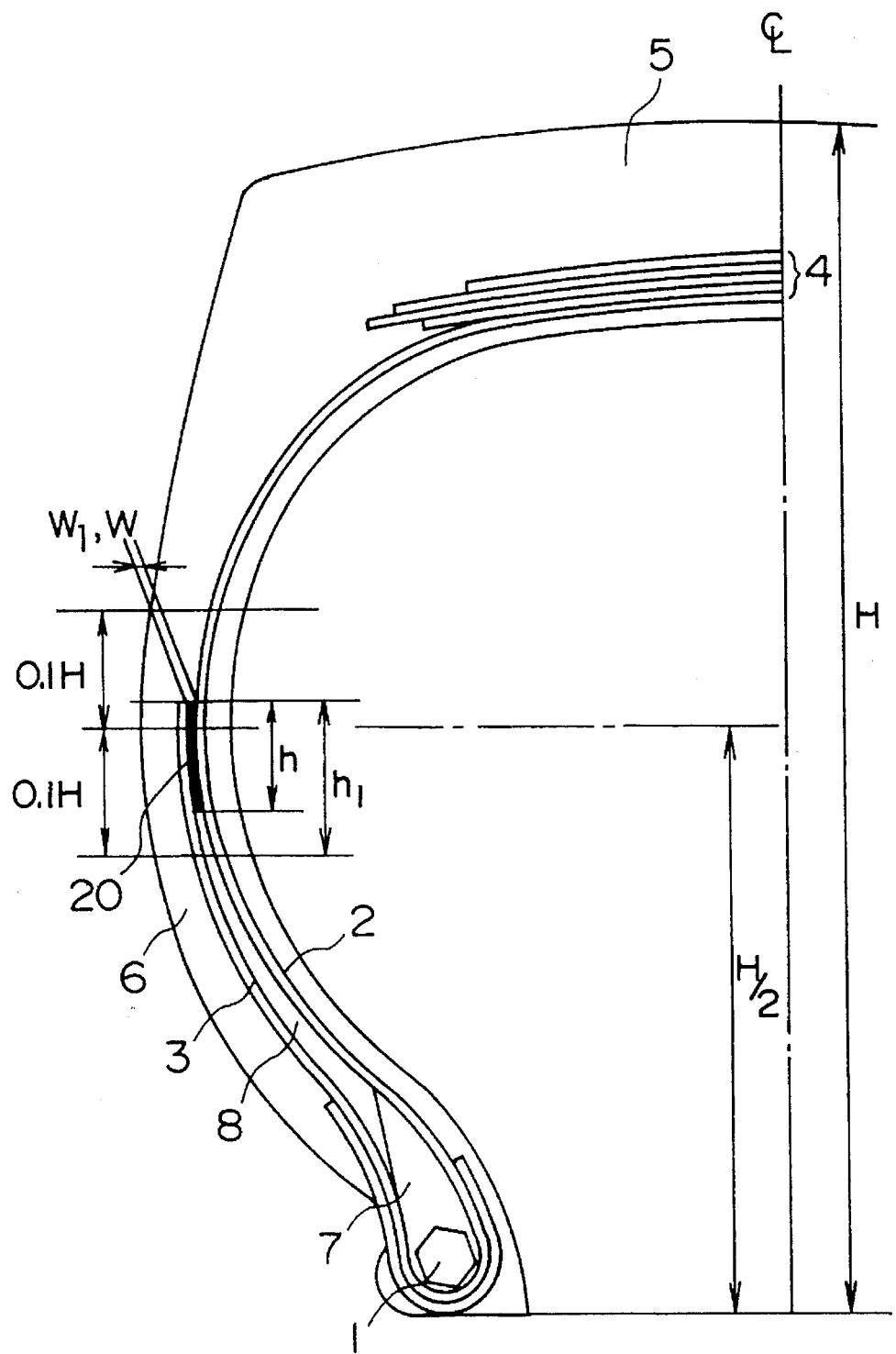

FIG.4 (a)
PRIOR ART
FIG.4 (b)
PRIOR ART
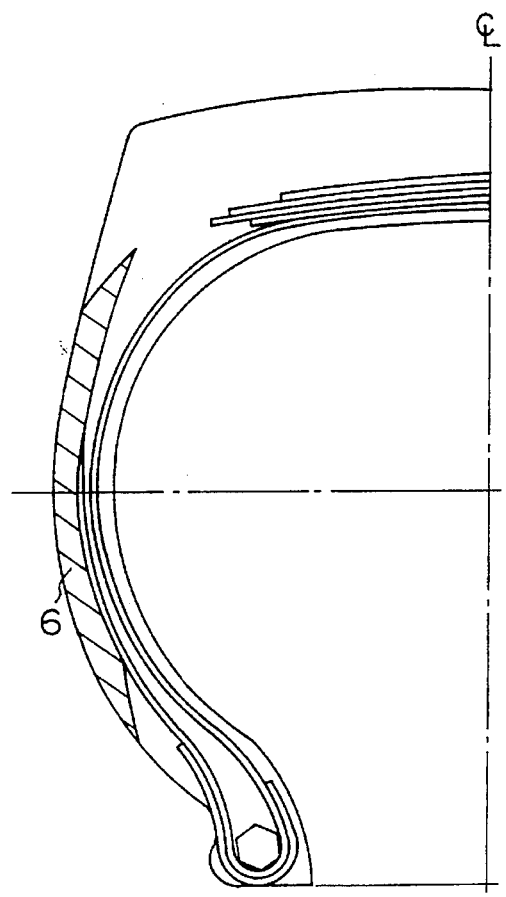
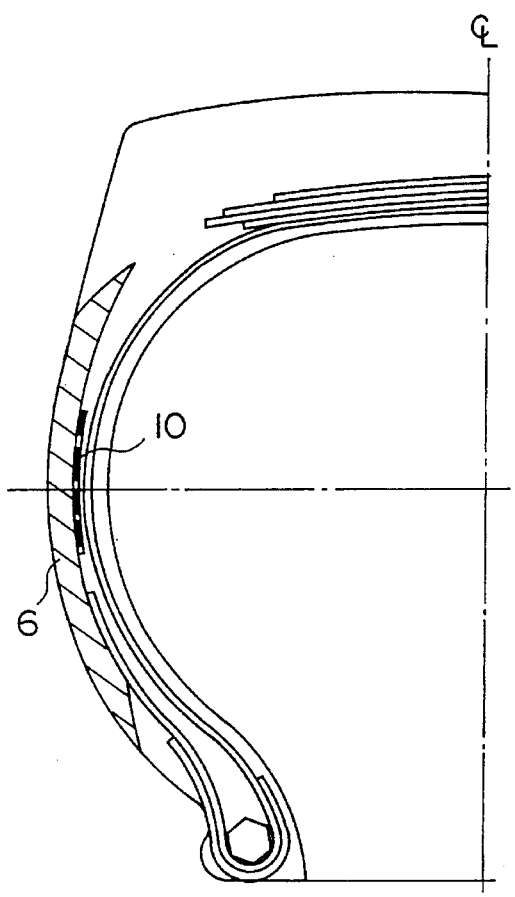

PNEUMATIC RADIAL TIRE WITH SIDE CUT RESISTANCE

BACKGROUND OF THE INVENTION

1. Field of the Invention

This invention relates to a pneumatic radial tire, particularly for construction vehicles. The invention is concerned with improvement of durability, more particularly improvement of side cut resistance against external damage of side areas of the tire.

2. Description of the Prior Art

In general, since a pneumatic radial tire for a construction vehicle runs on rough roads, side portions can be damaged easily by stones and tree stumps. Side cuts are classified into two groups, firstly leakage of air caused by penetration in the side portion that is damaged by shock cuts, and secondly leakage of air caused by growing of cuts by repeated deformation resulting in penetration and leakage of air in the side portion. In a pneumatic radial tire for a construction vehicle, conventionally, in addition to the extension of turn-up portions of a carcass ply to around the maximum width of the tire, a side rubber 6 having good shock cut property or crack growth resistance may be arranged to extend from buttress portions of a tread to around bead portions covering the outside of a turn-up ply. This is shown in FIG. 4(a) of the accompanying drawings, which is a cross-sectional view of a tire of the prior art. Further, at least one reinforcing layer 10 may be arranged outside a main ply, which is damaged by cuts frequently, as shown in FIG. 4(b) of the accompanying drawings, which is a cross-sectional view of another tire of the prior art.

It is an object of the present invention to restrain speed of cut growth resulting from leakage of air caused by repeated deformation in a pneumatic radial tire for a construction vehicle without deteriorating other aspects of the tire performance.

SUMMARY OF THE INVENTION

According to a first aspect of the invention, there is provided a pneumatic radial tire, particularly for a construction vehicle, having at least one carcass ply arranged toroidally between a pair of bead cores and containing rubber coated steel cords disposed radially therein, being turned up around each bead core from the inside to the outside of the tire. A carcass turn-up portion around each bead core extends to around one half height H/2 of a tire height H. When the radial length of an overlapping portion of the turn-up portion of the at least one carcass ply and a main portion of the at least one carcass ply is $h_1$ and the thickness of the overlapping portion is $w_1$ within a range of ±0.1 H having half height H/2 of the tire height H as the center, a radial length h and a thickness w of a reinforcing rubber material arranged between the turn-up portion of the at least one carcass ply and the main portion of the at least one carcass ply satisfy the following formulae (1) $0.2 w_1 \leq w \leq 1.0 w_1$, and (2) $0.5 h_1 \leq h \leq 1.0 h_1$, and the reinforcing rubber material satisfies the following conditions (3) 100 parts by weight of rubber includes 10–80 parts by weight of a cis-1,4 polybutadiene, and (4) a modulus of elasticity $M$ is 60 kgf/cm$^2 \leq M \leq 100$ kgf/cm$^2$ at 300% elongation and a rebound resilience coefficient $R$ is $0.4 < R < 0.7$.

In one embodiment $0.3 w_1 \leq w \leq 1.0 w_1$ and $0.7 h_1 \leq h \leq 1.0 h_1$.

In condition (4), by modulus of elasticity M at 300% elongation, there is meant that the modulus of elasticity is measured when the rubber is stretched 300%, that is the rubber is stretched to four times its original length.

According to a second aspect of the invention, there is provided a pneumatic radial tire, particularly for a construction vehicle, having at least one carcass ply arranged toroidally between a pair of bead cores and containing rubber coated steel cords disposed radially therein, being turned up around each bead core from the inside to the outside of the tire. At least one independent reinforcing layer, containing rubber coated reinforcing cords therein, is placed in each side portion of the tire. A total length of the radial length of an overlapping portion of the at least one reinforcing layer and a main portion of the at least one carcass ply and the radial length of an overlapping portion of the turn-up portion of the at least one carcass ply and the main portion of the at least one carcass ply is $h_2$, and the thickness of the overlapping portion of the at least one reinforcing layer and the main portion of the at least one carcass ply is $w_2$ within a range of ±0.1 H having half height H/2 of a tire height H as the center. The radial length h and the thickness w of a reinforcing rubber material arranged between the at least one reinforcing layer and the main portion of the at least one carcass ply then satisfy the following formulae (1) $0.2 w_2 \leq w \leq 1.0 w_2$, and (2) $0.5 h_2 \leq h \leq 1.0 h_2$, and the reinforcing rubber material satisfies the following conditions (3) 100 parts by weight of rubber includes 10–80 parts by weight of a cis-1,4 polybutadiene, and (4) a modulus of elasticity $M$ is 60 kgf/cm $\leq M \leq 100$ kgf/cm$^2$ at 300% elongation and a rebound resilience coefficient $R$ is $0.4 < R < 0.7$.

When a pneumatic radial tire for a construction vehicle is deformed by applying a load, since portions around one half height H/2 of the tire height H expand outward of the tire, which is easily damaged by cuts from stones and tree stumps, and since the portions have a strong circumferential tension at the surface of the tire, these portions are liable to suffer cut damage. For this reason, in a pneumatic radial tire for a construction vehicle, the carcass turn-up portion extends to around one half height H/2 of the tire height H in order to obtain durability of the carcass. As a result, the carcass turn-up portion prevents cuts from stones or the like from growing deeper, and penetration in the side portions of the tire decreases drastically.

However, leakage of air caused by cut growth continues long after the tire has suffered the cuts. Thus, it becomes important to restrain the cut growth. In a pneumatic radial tire for a construction vehicle, the cuts which stop at the carcass turn-up portion grow inside the tire because of a convergence of stress into the cuts, by the circumferential strain during running and the shearing strain between the carcass turn-up portion and the main carcass portion.

Consequently, it is necessary to restrain the cut growth inside the carcass turn-up portion to about one half height H/2 of the tire height H.

The present inventors have found that, when the overlapping radial length of an overlapping portion of the carcass turn-up portion and the main carcass portion is $h_1$ and the thickness of the overlapping portion is $w_1$ within a range of ±0.1 H having half height H/2 of the tire height H as the center, the radial length h and the thickness w of a reinforcing rubber material arranged between the carcass turn-up portion and the main carcass portion satisfy the following formulae (1) $0.2w_1 \leq w \leq 1.0w_1$, and (2) $0.5h_1 \leq h \leq 1.0h_1$, and the reinforcing rubber material satisfies the following conditions (3) 100 parts by weight of rubber includes 10–80 parts by weight of a cis-1,4 polybutadiene, and (4) a modulus of elasticity M is 60 kgf/cm$^2 \leq M \leq$ 100 kgf/cm$^2$ at 300% elongation and a rebound resilience coefficient R is $0.4 < R < 0.7$, are effective.

The reinforcing rubber material includes high cis-1,4 polybutadiene for anti-crack growth purposes. If the content of cis-1,4 polybutadiene is less than 10 parts by weight, recommended crack growth resistance cannot be obtained. If the content of cis-1,4 polybutadiene exceeds 80 parts by weight, tensile breaking load deteriorates. If the modulus of elasticity M is less than 60 kgf/cm$^2$, rigidity of the tire deteriorates while if the modulus of elasticity exceeds 100 kgf/cm$^2$, the crack growth resistance decreases and rigidity of the tire deteriorates. If the rebound resilience coefficient is equal to or less than 0.4, durability of the tire deteriorates while if the rebound resilience coefficient is equal to or greater than 0.7, the crack growth resistance cannot be obtained.

If the thickness w of the reinforcing rubber material is less than 0.2 of $w_1$, crack growth cannot be restricted. If w exceeds 1.0 $w_1$, the weight of the tire increases too much. If the radial length h of the rubber material is less than 0.5 $h_1$, the crack growth cannot be restricted, while if the radial length h is greater than 1.0 $h_1$, the weight of the tire increases too much.

According to the second aspect of the invention, in a pneumatic radial tire for a construction vehicle having a carcass arranged toroidally between a pair of bead cores, the carcass containing rubber coated steel cords disposed radially therein and being turned up around each bead core from the inside to the outside of the tire and at least one independent reinforcing layer containing reinforcing cords therein located in each side portion of the tire, the reinforcing rubber material having the above mentioned conditions is also effective.

BRIEF DESCRIPTION OF THE DRAWINGS

FIG. 1 is a cross-sectional view of a tire of a first embodiment of the present invention;

FIGS. 4(a) and 4(b) are cross-sectional views of tires of the prior art.

DESCRIPTION OF THE PREFERRED EMBODIMENTS

Figure 2A:
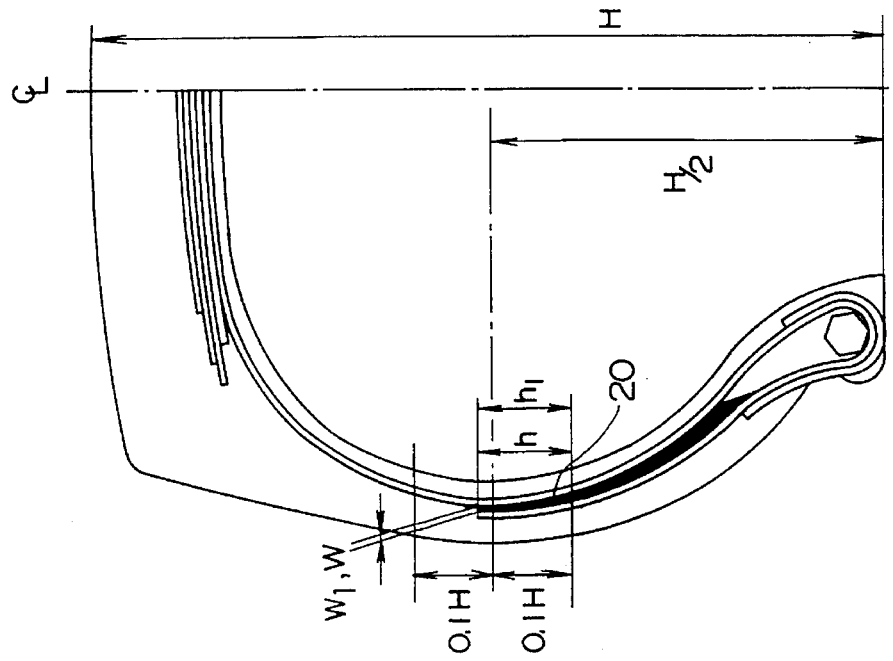
FIGS. 2(a) and 2(b) are cross-sectional views of tires of second and third embodiments of the present invention.

A pneumatic radial tire for a construction vehicle having a size of 18.00R33 was used as an embodiment of the present invention. The pneumatic radial tire of a first embodiment shown in FIG. 1 has a carcass 2 comprising steel cords disposed toroidally and radially between a pair of bead cores 1, the carcass being turned up around the respective bead cores from the inside to the outside of the tire to form turn-up portions 3 of the carcass. The carcass has steel cords whose construction is 1×3+9+15 with a tensile breaking load of 300 kgf/piece. A belt 4 comprising four steel cord layers crossing each other is arranged radially outside of the carcass 2, and a tread 5 is arranged radially outside of the belt. The belt 4 consists of two cross layers having steel cords whose construction is (1+6)+6×(1+6) with a tensile breaking load of 400 kgf/piece and two cross layers having high elongation steel cords whose construction is 3×7 with a tensile breaking load of 170 kgf/piece. The cords of each layer form an angle of 23° with respect to an equatorial plane of the tire.

A sidewall rubber 6 is arranged radially outside of a turn-up portion 3 of the turn-up carcass ply 2. The carcass ply is turned up around the bead core 1 and extends to around one half height H/2 of the tire height H as measured from the bead baseline. A stiffener rubber 7 is arranged radially outside the bead core 1, and a pad rubber 8 is arranged along the carcass ply 2 between the stiffener rubber 7 and the turn-up portion 3 of the carcass ply. In the first embodiment, a reinforcing rubber material 20 having a length h of $0.7h_1$ and a thickness w of $1.0w_1$ within a range of ±0.1 H having half height H/2 of the tire height H as the center is positioned between the turn-up portion 3 of the carcass ply and the main ply 2, where $h_1$ is the length of an overlapping portion of the turn-up portion of the carcass ply 3 and the main ply 2, and $w_1$ is the thickness of the overlapping portion.

In a second embodiment of the invention as shown in FIG. 2(a), a reinforcing rubber material 20 having a length h of $0.9h_1$ and a thickness w of $0.3w_1$ within a range of ±0.1 H having half height H/2 of the tire height H as the center is positioned between the turn-up portion of the carcass ply and the main ply.

Figure 2B:
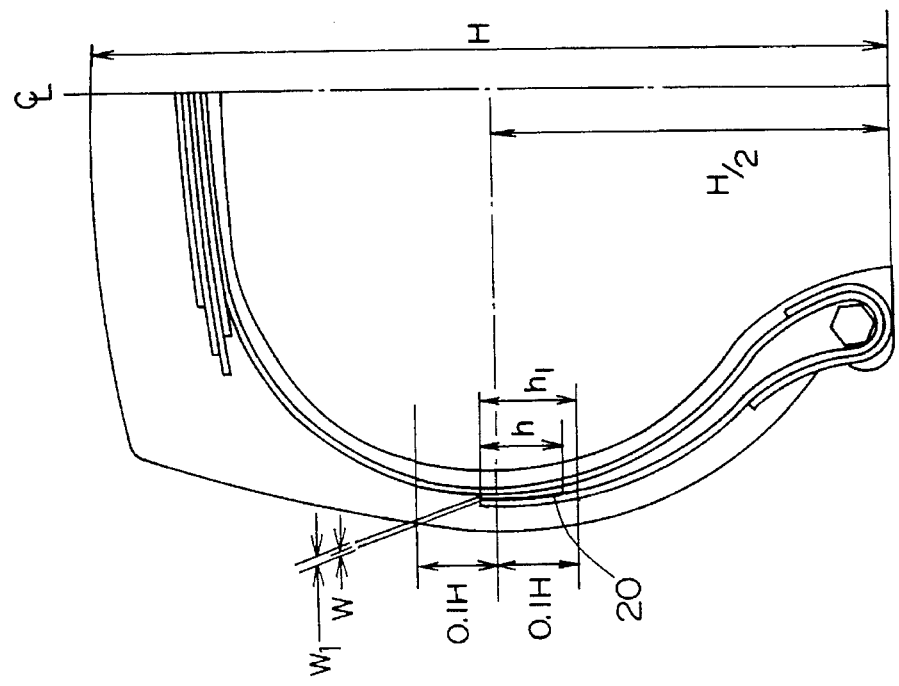

In a third embodiment of the invention as shown in FIG. 2(b), the construction is almost the same as that of the first and the second embodiments, but the pad rubber 8 functions as the reinforcing rubber material 20 at the same time. The reinforcing rubber material 20 having a length of $1.0h_1$ and a thickness w of $1.0w_1$ within a range of ±0.1 H having half height H/2 of the tire height H as the center is positioned between the turn-up portion of the carcass ply and the main ply.

Figure 3:
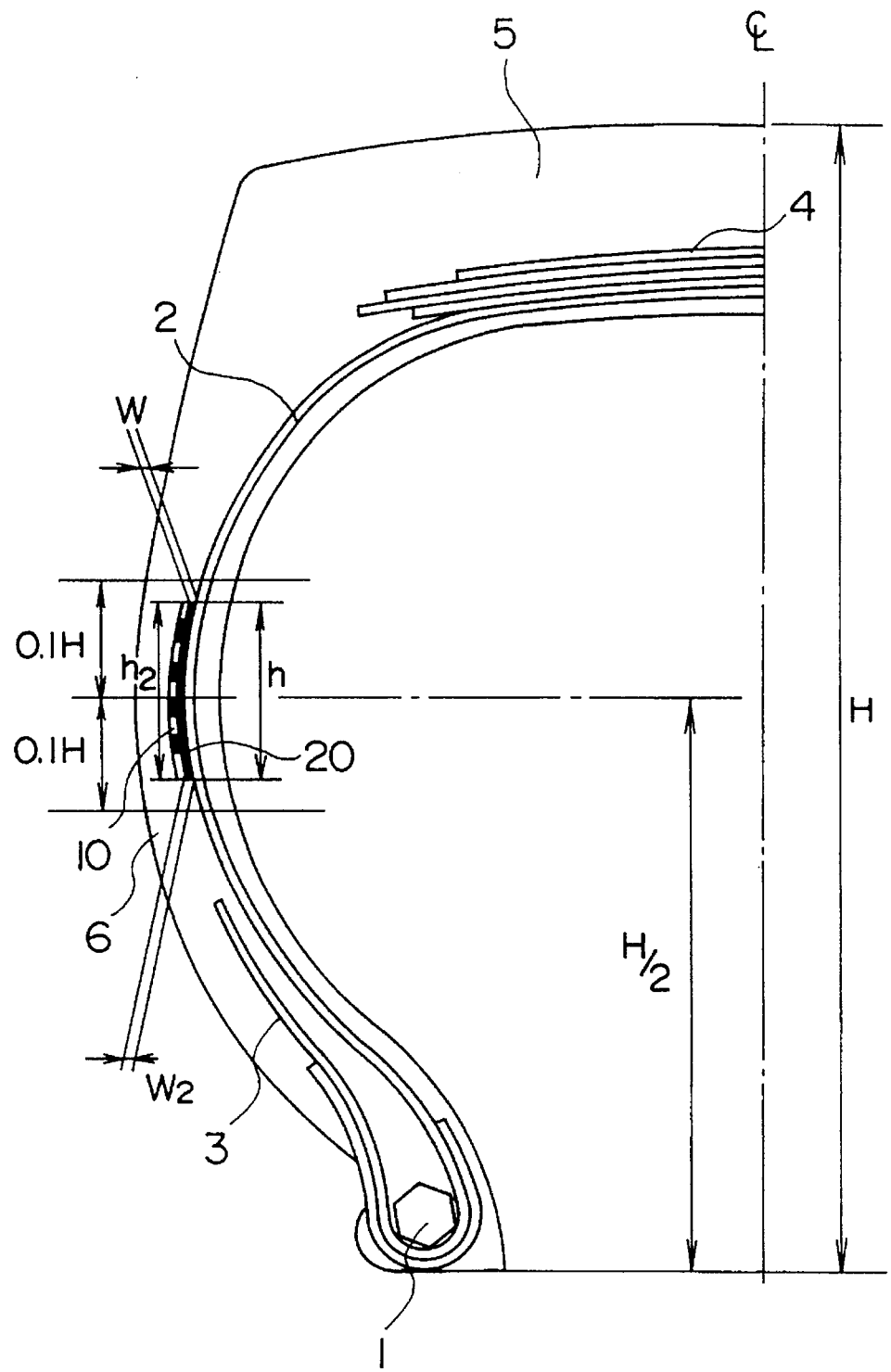
FIG. 3 is a cross-sectional view of a tire of a fourth embodiment of the present invention.

In a fourth embodiment of the invention as shown in FIG. 3, which is similar to the conventional tire shown in FIG. 4(b), in a tire having a reinforcing cord layer 10 independent from the turn-up portion of the carcass ply, the reinforcing rubber material 20 having a length h of $1.0h_2$ and a thickness w of $1.0w_2$ is positioned between the turn-up portion of the carcass ply and the main ply.

In the fourth embodiment of the invention, the total length of an overlapping portion of the reinforcing layer and a main carcass ply 2 and the length of an overlapping portion of a turn-up portion 3 of the carcass ply and the main carcass ply is $h_2$. The thickness of the overlapping portion of the reinforcing layer 10 and the main carcass ply 2 is $w_2$ within a range of ±0.1 H having half height H/2 of the tire height H as the center.

It should be noted that, in the embodiment shown in FIG. 3, the turn-up portion 3 of the carcass ply does not overlap with the main ply 2 within the range of ±0.1 H.

The composition of the reinforcing rubber material of the first, second, third and fourth embodiments is shown in Table 1. The same composition is used for all four embodiments. In the reinforcing rubber material, a modulus of elasticity M is 75 kgf/cm$^2$ at 300% elongation and a rebound resilience coefficient R is 0.6.

TABLE 1

| Composition of the reinforcing rubber material (Parts by weight) | |
| --- | --- |
| Natural rubber | 50 |
| High cis-1,4 polybutadiene*1 | 50 |
| Carbon black (HAF) | 40 |
| Sulfur | 1.5 |
| Zinc white | 3 |
| Vulcanization accelerator (NS)*2 | 1 |
| Stearic acid | 2 |
| Age resister | 2 |

*1; BR01(cis-1,4 content 97%) manufactured by Japan Synthetic Rubber Company Limited.
*2; N-tert-butyl-2-bezothiazolyl-sulferamide.

In order to evaluate the effects of the first (FIG. 1), second (FIG. 2(a)) and third (FIG. 2(b)) embodiments, a prior art tire 1 (FIG. 4(a)) was prepared as a comparison; and in order to evaluate the fourth embodiment (FIG. 3), a prior art tire 2 (FIG. 4(b)) was prepared. Cut growth resistance and durability were tested under the following conditions.

In order to evaluate the cut growth resistance, cuts having a length of 80 mm, a width of 0.5 mm, a depth reaching the turn-up portion of the carcass ply and angles (of the cuts) of 0° and 15° with respect to the radial direction of the tire were formed previously, and the tires were run on a drum. Running time until leakage of air occurred was indexed for evaluation purposes. In the drum test, the air pressure was 7.0 kPa, the speed was 10.0 km/h, the load was 11.0 ton and the diameter was 4000 mm. The results are shown in Table 2 below. In the Table, the results of the first, second and third embodiments are expressed using an index that the running time of the prior art tire 1 is 100, and the result of the fourth embodiment is expressed using an index that the running time of the prior art tire 2 is 100. In the Table, the higher the value, the better the performance. As is apparent from the Table, the cut growth resistance of the tire of the first embodiment is 150, that of the second embodiment is 130, and that of the third embodiment is 160; thus, remarkable cut growth resistance can be observed compared with the prior art tire 1. In the tire of the fourth embodiment, remarkable cut growth resistance can also be observed compared with the prior art tire 2.

In order to evaluate durability, running time of a tire without forming cuts, which runs on a drum, until damage occurs was indexed for evaluation purposes. In the Table, the results of the first, second and third embodiments are expressed using an index that the durability of the prior art tire 1 is 100, and the result of the fourth embodiment is expressed using an index that the durability of the prior art tire 2 is 100. In the Table, the higher the value, the better the performance. As is apparent from the Table, the tires of the first, second and third embodiments have almost the same durability as the prior art tire 1, and also the tire of the fourth embodiment has the same durability as the prior art tire 2.

TABLE 2

| | Embodiment 1 | Embodiment 2 | Embodiment 3 | Prior Art 1 | Embodiment 4 | Prior Art 2 |
| --- | --- | --- | --- | --- | --- | --- |
| Cut Growth resistance | 150 | 130 | 160 | 100 | 150 | 100 |
| Durability | 100 | 100 | 98 | 100 | 100 | 100 |

As can be seen from the above explanation, a pneumatic radial tire for a construction vehicle according to the first aspect of the invention improves cut growth resistance remarkably without affecting durability compared with a conventional tire. Further, a pneumatic radial tire for a construction vehicle according to the second aspect of the invention also improves cut growth resistance without affecting durability compared with the conventional tire.

While the invention has been particularly shown and described with reference to certain preferred embodiments thereof, it will be understood by those skilled in the art that various changes and modifications may be made without departing from the spirit and scope of the invention.

We claim:

1. A pneumatic radial tire comprising: at least one carcass ply arranged toroidally between a pair of bead cores, said at least one carcass ply containing rubber coated steel cords disposed radially therein and being turned up around each bead core from inside to outside of the tire, the carcass turn-up portion around each bead core extending to around one half height H/2 of a tire height H, wherein, when a radial length of an overlapping portion of the turn-up portion of the at least one carcass ply and a main portion of said at least one carcass ply is $h_1$ and a thickness of the overlapping portion is $w_1$ within a range of ±0.1 H having half height H/2 of the tire height H measured from a bead base line as the center, a radial length h and a thickness w of a reinforcing rubber material arranged between the turn-up portion of the at least one carcass ply and the main portion of said at least one carcass ply satisfy the following formulae (1) $0.2w_1 \leq w \leq 1.0w_1$, and (2) $0.5h_1 \leq h \leq 1.0h_1$, and said reinforcing rubber material satisfies the following conditions (3) 100 parts by weight of rubber includes 10–80 parts by weight of a cis-1,4 polybutadiene, and (4) a modulus of elasticity M is 60 kgf/cm² $\leq M \leq$ 100 kgf/cm² at 300% elongation and a rebound resilience coefficient R is 0.4<R<0.7.

2. The pneumatic radial tire of claim 1, wherein: $0.3w_1 \leq w \leq 1.0w_1$.

3. The pneumatic radial tire of claim 1, wherein: $0.7h_1 \leq h \leq 1.0h_1$.

4. The pneumatic radial tire of claim 1, wherein said reinforcing rubber material has a length h of $0.9h_1$ and a thickness w of $0.3w_1$.

5. The pneumatic radial tire of claim 1, wherein said reinforcing rubber material has a length h of $1.0h_1$ and a thickness w of $1.0w_1$.

6. The pneumatic radial tire of claim 1, wherein the carcass rubber coated steel cords have a 1×3+9+15 construction.

7. The pneumatic radial tire of claim 1, further comprising a belt positioned radially outside said at least one carcass ply and comprising four layers having steel cords crossing each other at an angle of 23° with respect to an equatorial plane of the tire.

8. The pneumatic radial tire of claim 1, further comprising a belt positioned radially outside said at least one carcass ply and comprising two layers having steel cords of a (1+6)+6×(1+6) construction crossing each other and two layers having steel cords of a 3×7 construction crossing each other.

* * * * *